United States Patent [19]
Lewis

[11] 3,854,758

[45] Dec. 17, 1974

[54] FLEXIBLE EXPANSION JOINT HAVING MEANS FOR LIMITING LATERAL MOVEMENT

[75] Inventor: Douglas R. Lewis, Summit, N.J.

[73] Assignee: Ethylene Corporation, Murray Hill, N.J.

[22] Filed: May 4, 1973

[21] Appl. No.: 357,328

[52] U.S. Cl.................. 285/114, 285/224, 285/226
[51] Int. Cl............................................. F16l 13/04
[58] Field of Search ........... 285/224, 226, 227, 228, 285/114; 138/118, 121

[56] References Cited
UNITED STATES PATENTS

| | | | |
|---|---|---|---|
| 1,191,486 | 7/1916 | Tyler................................... | 285/226 |
| 2,707,117 | 4/1955 | Fentress et al...................... | 285/226 |
| 2,721,746 | 10/1955 | Schindler......................... | 285/226 X |
| 2,886,066 | 5/1959 | Hanson............................ | 285/226 X |

FOREIGN PATENTS OR APPLICATIONS

| | | | |
|---|---|---|---|
| 1,112,743 | 11/1955 | France............................... | 285/227 |

Primary Examiner—Dave W. Arola
Attorney, Agent, or Firm—Charles E. Temko

[57] ABSTRACT

A flexible expansion joint or coupling of the type disclosed in U.S. Pat. No. 3,527,481 having incorporated therein means for preventing substantial lateral movement of individual expansion limiting means surrounding the flexible conduit element thereof to prevent the assumption of a laterally displaced spiral-like configuration normally preceding the bursting of the conduit element as a result of internal pressure. The means permits a limited degree of pivotal movement of the expansion limiting means about an axis perpendicular to the principal axis of the flexible conduit element.

3 Claims, 10 Drawing Figures

PATENTED DEC 17 1974  3,854,758
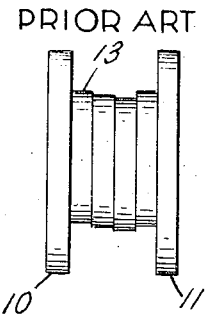
FIG.1 PRIOR ART
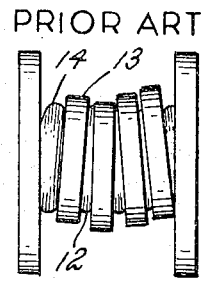
FIG.2 PRIOR ART
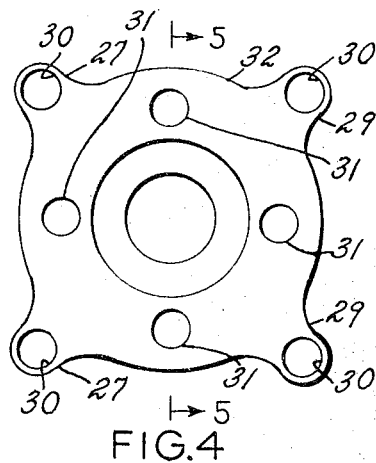
FIG.4
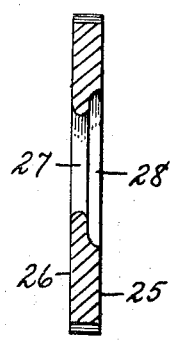
FIG.5
FIG.3
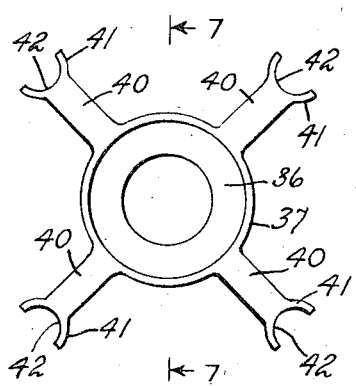
FIG.6
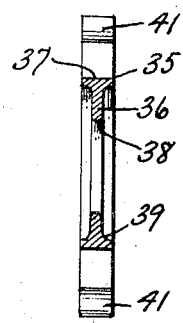
FIG.7
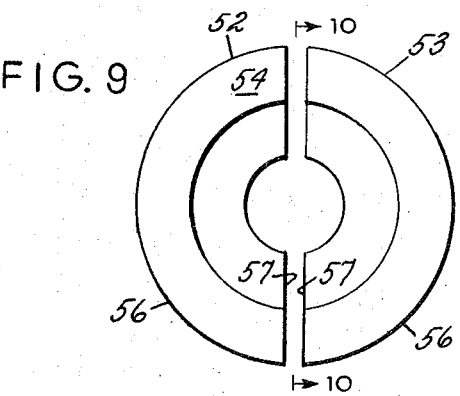
FIG.9
FIG.8
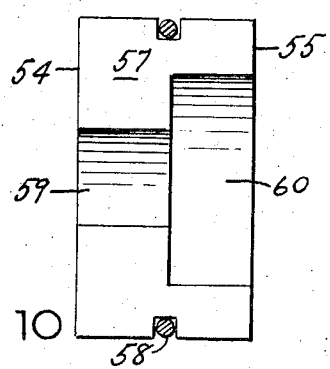
FIG.10

3,854,758

FLEXIBLE EXPANSION JOINT HAVING MEANS FOR LIMITING LATERAL MOVEMENT

BACKGROUND OF THE INVENTION

This invention relates generally to the field of flexible expansion joints or couplings used to interconnect rigid pipes or conduits forming part of a fluid conducting system. Devices of this type are well known in the art, and the invention lies in specific constructional details permitting the use of axially longer flexible conduit elements or bellows with less danger of rupture by reducing the possibility of occurrence of a laterally displaced condition thereof known as "squirm."

Devices of the instant type normally include a pair of oppositely disposed rigid plates which are bolted or otherwise connected to the flanges of rigid pipes or conductors placed in communication by the device. The flanges support the opposed ends of a bellows-like flexible conduit element, the effective length of which is variable along the principal axis to relieve stresses placed upon the system during operation. A limited degree of axial misalignment between the rigid conductors is also accommodated by the flexibility of the flexible conduit element, which is usually formed of chemically inert synthetic resinous materials, such as polytetrafluoroethylene. During normal operation of the fluid system, the flexible conduit element is subjected to substantial internal pressure, and to provide resistance to bursting, it is common practice to place rigid metallic bands at the inner folds of the bellows. As the number of folds in the bellows is increased, with a corresponding number of bands, lateral movement of portions of the flexible conduit element increases, producing effective area imbalance which leads to even greater lateral movement. Prior to bursting, the flexible conduit element moves in a lateral direction between the secured ends thereof pivoting the surrounding limiting means, whereby an exposed convolution of the flexible conduit element at one side or the other bulges past its elastic limit and subsequently ruptures. It has been observed that there is a definite sequential relation between the occurrence of this lateral, spiral-like displacement, usually referred to as "squirm", and the subsequent failure of the flexible conduit element. If the occurrence of this condition is hindered, therefore, subsequent bursting is also hindered and use at higher pressures becomes possible.

BRIEF DESCRIPTION OF THE PRESENT INVENTION

Briefly stated, the invention contemplates the provision of a device of the character described, in which the expansion limiting devices, normally referred to as "T-Bands" are supported against substantial lateral displacement, and all but relatively limited pivotal movement about the principal axis of the flexible conduit element. Thus, squirming of the latter is minimized, and greater internal pressures are permissible. This result is conveniently accomplished by providing a plurality of parallel longitudinally arranged shafts or rods interconnecting the flanges at each end of the flexible conduit element. The T-Bands are provided with laterally arranged extensions or spokes, the outer ends of which are supported by the shafts as the bellows section of the flexible conduit element expands and contracts. As this occurs, the lateral extensions slide on the rods, and can pivot, if necessary, up to an angle determined by the looseness of the sliding contact. The shafts or rods, at each end thereof, extend through openings in the oppositely disposed flanges, and are accurately machined at each end to accept a split collar held in position by a snap ring, thereby assuring equal effective length of each shaft, and eliminating any variation between the shafts caused by unequal tightening of nuts on bolts which are replaced by the split collars. This construction assures that at full extension of the bellows, the shafts will remain truly parallel, and under equal tension, and thus maintain the flanges in mutual parallel relation, so that there will be no tendency to introduce squirm from this source.

BRIEF DESCRIPTION OF THE DRAWINGS

In the drawings, to which reference will be made in the specification, similar reference characters have been employed to designate corresponding parts throughout the several views.

FIG. 1 is a side elevational view showing a typical joint in fully contracted condition, manufactured in accordance with prior art.

FIG. 2 is a similar side elevational view, showing further development of lateral displacement of the flexible conduit element after it has been fully extended, and exposing a portion thereof just prior to bursting.

FIG. 3 is a side elevational view of an embodiment of the present invention.

FIG. 4 is a view in elevation showing one of the end flange elements comprising a part of the embodiment.

FIG. 5 is a central transverse sectional view as seen from the plane 5—5 in FIG. 4.

FIG. 6 is a view in elevation showing one of a plurality of expansion limiting means.

FIG. 7 is a central transverse sectional view as seen from the plane 7—7 in FIG. 6.

FIG. 8 is a view in elevation, partly in section of an interconnecting shaft or rod.

FIG. 9 is an expanded view of a split collar element retaining the structure of FIG. 8 in assembled condition.

FIG. 10 is a side elevational view of a collar member as seen from the Plane 10—10 in FIG. 9.

DETAILED DESCRIPTION OF THE DISCLOSED EMBODIMENT

Before specifically describing the disclosed embodiment, a brief consideration of the prior art is considered apposite. Referring to FIG. 1 in the drawing, a known joint is illustrated, including first and second flange members 10 and 11 supporting a flexible conduit element or bellows 12 (FIG. 2) therebetween. The element 12 is surrounded by a plurality of limiting means 13 of T-shaped cross section. As seen in FIG. 1, internal pressure has caused lateral and unequal shifting of the limiting means 13, although in relatively compressed condition. The element 13 is in no danger of failure.

In FIG. 2, the flanges 10 and 11 are moved axially apart, resulting in the individual rings forming the limiting means 13 moving corresponding distances. Because they have laterally shifted, the condition referred to hereinabove as squirm has occurred, and the leftwardmost fold 14 has bulged. In due course, the elastic limit of the fold will have been passed, and bursting will occur.

With the foregoing in mind, reference may now be made to FIG. 3, which illustrates an embodiment, generally referred to by reference character 17, of the invention. As is the case in the prior art, the embodiment 17 includes first and second end flanges 18 and 19, a flexible conduit 20, a plurality of expansion limiting means 21. Interconnecting the flanges 18 and 19 are a plurality of elongated shaft or rod elements 22, having at each end thereof a split collar element 23.

Referring to FIGS. 4 and 5, the flanges 18 and 19 are generally similar, each including an outer surface 25, an inner surface 26, a centrally disposed bore 27 and a counter bore 28. This configuration is standard in the prior art, and provides a recess into which the ends of the flexible conduit element 12 are seated. Lateral extensions or ears 29 are most conveniently four in number, each including a centrally disposed bore 30 through which a portion of a shaft element 22 passes. Mounting holes 31 are positioned to accommodate corresponding holes in the pipe flanges being interconnected, and are positioned radially inwardly of a curved peripheral surface 32.

Referring to FIGS. 6 and 7, the expansion limiting elements 21 are similar, each including a main body member 35 having a transversely extending portion 36 and a peripheral portion 37, the two portions forming a "T-shaped" cross section. Suitable radii at 38 and 39 prevent the occurrence of sharp edge which might cut the synthetic resinous conduit element 12.

Extending laterally from the outer surface of the peripheral portion 37 are members 40, the number of which corresponds to the number of shaft elements 22, each terminating in a bifurcated end member 41 forming a half round recess 42.

Referring to FIG. 8, the shaft elements 22 are all similar, each including a cylindrical member 44 the outer surface 45 of which is preferably provided with a friction reducing sleeve 46, preferably of polytetrafluoroethylene, the outer surface 47 of which provides low friction contact with the recesses 42 of the members 40.

FIGS. 9 and 10 illustrate the collar elements 23, each of which include first and second symmetrical members 52 and 53, respectively. Each member is bounded by first and second end surfaces 54 and 55, a cylindrical surface 56 and a planar surface 57. When the members 52 and 53 are interconnected by snap ring means 58, they, together, define a centrally disposed bore 59 and a counter bore 60, the former of which engages the neck portion 48, and the latter of which engages the enlargement 49 on the corresponding shaft element 22.

In assembled condition, it will be observed that by virtue of careful machining, and the elimination of threaded pieces which must be tightened to position, the collar elements 23 each present a surface which contacts an outer surface of one of the flanges 18 and 19, thereby assuring that the shaft elements 22 are of equal length, within extremely close tolerances. Thus, when the joint is at full extension, the flanges are mutually parallel, and there is no tendency to cause lateral movement of the flexible conduit element 20 in any particular lateral direction. Thus, the laterally extending members 40 of the expansion limiting means 21 slide smoothly over the shaft elements 22 with a minimum of normal reaction.

I wish it to be understood that I do not consider the invention limited to the precise details of structure shown and set forth in this specification, for obvious modifications will occur to those skilled in the art to which the invention pertains.

I CLAIM:

1. In a flexible joint coupling for use in interconnecting a pair of rigid conduits and including first and second flange elements connected to a bellows-type flexible conduit element having means surrounding the same limiting radial expansion thereof under internal pressure, the improvement comprising: said flange elements each having a plurality of outwardly extending ears, each ear having a centrally disposed bore therethrough, a corresponding plurality of axially extending rods, each slidingly interconnecting on each end thereof a bore in an ear on each of said flange elements, and means on said rods preventing disengagement of said flange elements from said rods; said means limiting radial expansion including a plurality of rigid bands surrounding portions of said flexible conduit element, each of said rigid bands having a plurality of outwardly extending members, the outer ends thereof having means slidably engaging medially disposed surfaces of said rods; whereby said first and second flange elements may slide axially on said rods as said flexible conduit element contracts, expands, and adapts to misalignment, and the outer ends of said outwardly extending members on said rigid bands slidingly engage said rods preventing substantial lateral shifting or displacement of the flexible conduit element.

2. Structure in accordance with claim 1, in which said shafts include a medially disposed segment having a friction reducing sleeve thereon, said sleeve projecting through said bores in said ears on said first and second flange elements.

3. Structure in accordance with claim 1, in which said means on said rods include an enlargement on at least one end thereof, and a split collar element engaging said enlargement and defining a planar surface abutting an outwardly positioned surface of at least one of said first and second flange elements, whereby the effective limit of axial expansion of said flexible conduit element caused by relative movement of said first and second flange elements may be maintained uniformly at each of the peripheral points of engagement of said flange elements with said rods.

* * * * *